Patented Sept. 26, 1950

2,523,477

UNITED STATES PATENT OFFICE 2,523,477

RAPIDLY CURING THERMOSETTING AMINOPLASTIC COMPOSITIONS

Daniel E. Nagy, Stamford, Conn., assignor to American Cyanamid Company, New York, N. Y., a corporation of Maine No Drawing. Application June 28, 1946, Serial No. 680,089

15 Claims. (Cl. 260—71)

This invention relates to amino-formaldehyde resins having incorporated therein latent curing agents. More specifically, the invention is directed towards compositions comprising an amino-formaldehyde resin and a latent curing agent such as acyl carbamylguanidine salts and their isomers acyl guanylurea salts.

It is well known that amino-formaldehyde resins such as urea formaldehyde and melamine formaldehyde as well as mixtures thereof are relatively slow curing, particularly at low temperatures. Accordingly, it is an object of this invention to devise rapid curing compositions comprising resins of this type and particularly to prepare stable composition which may be stored for very long periods of time without premature curing. It is a further object of this invention to prepare an amino-formaldehyde resin composition having incorporated therein a latent catalyst which will rapidly cure and yet maintain a good working life in water solutions.

The foregoing and other objects and advantages of this invention are attained by incorporating an acyl carbamylguanidine salt, its tautomer, its isomer, the acyl guanylurea salt, and its homologs in an amino-formaldehyde resin. These salts are quite stable. They may be mixed with the resin and stored for long periods of time without prematurely curing, and when dissolved in water, the mixed resin and salt has an excellent working life. Another important feature of this invention, from an industrial or economical viewpoint, is that the salts are relatively inexpensive as compared to other latent catalysts which have been tried for this utilization. These salts are excellent in stability, action, and price.

Acyl carbamylguanidine salts, tautomers, and the isomers thereof derived from organic acids having a dissociation constant of $10^{-5}$ or less, are satisfactory for utilization as latent catalysts. As examples of such acylating organic acids there may be mentioned acetic, lauric, and the like. The salts of these compounds are preferably utilized as the neutral salts since they have been found to be the most desirable.

As illustrations of some of the catalysts employed, and processes of making them, the following examples are given:

Example 1

Acetyl carbamylguanidine neutral sulfate was prepared by adding 103 parts of 95% sulfuric acid to a mixture of 260 parts acetic acid and 71.5 parts of acetic anhydride, with sufficient cooling to avoid the final temperature rising above 50° C. To this mixture there was then added, in small proportions, over a half-hour period, 84 parts of dicyandiamide. The reaction vessel was cooled during the addition of the dicyandiamide so that the temperature gradually increased from 50 to 60° C. as the first half of the dicyandiamide was added, and from 60 to 70° C. during the addition of the second half. During the reaction the insoluble acid sulfate salt of acetyl carbamylguanidine precipitated. This precipitate was filtered from the cold mixture; it was then recrystallized twice from hot water to yield 80% acetyl carbamylguanidine neutral sulfate hydrate.

Example 2

Acetyl carbamylguanidine neutral phthalate was prepared by reacting equimolecular proportions of acetyl carbamylguanidine neutral sulfate and disodium phthalate in water at room temperature, accompanied by agitation. When the double decomposition was complete, the precipitated acetyl carbamylguanidine neutral phthalate was filtered from the sodium sulfate solution, washed with water and air-dried.

Example 3

Lauroyl carbamylguanidine neutral sulfate was prepared by dissolving 80 parts of lauric acid in a mixture of 51 parts of 95% sulfuric acid and 392 parts of 7% free $SO_3$ oleum. To this mixture there was then added, during one hour, at 25 to 30° C., 60 parts of dicyandiamide accompanied by vigorous agitation. The reaction vessel was cooled intermittently by dipping in ice water to keep the temperature lowered. A thick mixture was obtained which was poured onto crushed ice, and the precipitated lauroyl carbamylguanidine sulfate obtained was thoroughly washed with water.

Example 4

Lauroyl guanylurea hydrochloride was prepared by adding 40 parts of lauroyl dicyandiamide to a mixture of 75 parts water, 39 parts 95% ethyl alcohol, and 20 parts concentrated hydrochloric acid. Upon heating the reaction mixture to reflux, complete solution of the lauroyl dicyandiamide was effected. Reflux was continued for 10 minutes and the clear solution cooled in an ice bath, whereupon the crystalline hydrochloride salt precipitated. The precipitate was cooled, washed with water and air-dried.

Example 5

Benzoyl guanylurea hydrochloride was prepared by heating one mol of benzoyl dicyandiamide with a slight excess of 10% hydrochloric acid to reflux for approximately 10 minutes. The clear solution obtained thereby was thoroughly chilled to yield a precipitate of the product which was filtered, washed with cold water and air-dried.

In order to illustrate one utilization or embodiment of these curing agents in amino-formaldehyde resins, the procedure for preparing resins of this type which have proven the utility of these compounds as curing agents for amino-formaldehyde resins, is given in the following examples.

A

This resin was prepared by charging 652 parts of 37% formaldehyde solution and 284 parts of urea to a suitable reaction vessel and adjusting the pH to 7.7 with sodium hydroxide. This mixture was then heated to reflux in approximately 30 minutes and held at this temperature until the desired viscosity (58–62 centipoises at 20° C. Stormer viscosimeter) was obtained. The pH was then adjusted to 8.0 with sodium hydroxide and cooled to between 30 and 35° C. very rapidly. In this form it may be stored or modified with extenders such as wood flour, pigments, buffers and the like.

B

This resin was prepared by mixing equal parts of spray-dried resin A and equal parts of a spray-dried melamine formaldehyde resin prepared in the following manner: 115 parts of 37% formaldehyde solution and 60 parts of melamine were charged to a suitable reaction vessel and adjusted to 7.0 with sodium hydroxide. The mixture was then heated to 85° C. in 30 minutes, cooled thereafter to 70° C. in 15 minutes, and held at this temperature until it hydrophobed at 60° C. in water, this usually taking one to two hours. The reaction mixture was adjusted to pH 9.0 with sodium hydroxide, cooled to 20° C., and spray-dried.

To 100 parts of a mixture of equal parts of these two resins there was added 40 parts of water to form a thick paste and thereafter sufficient water was added to give the desired uniformity, 25 parts usually being sufficient.

The above resins were blended with accelerators of the type described herein above to effect laminating adhesives. These compositions were applied to plywood and cured to give excellent glue line properties. The composition of the adhesive and conditions of cure and properties of the products obtained are tabulated in the following table wherein AN–G–8 specification tests were followed:

Resin A

| Accelerator | Per Cent | Cure Cycle | | | Shear Strength | | Work Life, Hours | Over Night Set |
|---|---|---|---|---|---|---|---|---|
| | | °F. | Min. | P. s. i. | P. s. i. Dry | P. s. i. Wet | | |
| acetyl carbamyl guanidine neutral sulfate | 0.25 | 240 | 2 | 250 | 490 | 240 | 24 | syrup. |
| | 0.25 | 240 | 3 | 250 | 610 | 370 | 24 | Do. |
| | 0.25 | 240 | 5 | 250 | 650 | 420 | 24 | Do. |
| | 0.50 | 240 | 2 | 250 | 550 | 360 | 24 | Do. |
| | 0.50 | 240 | 3 | 250 | 600 | 420 | 24 | Do. |
| | 0.50 | 240 | 5 | 250 | 700 | 580 | 24 | Do. |
| | 1.00 | 240 | 1 | 250 | 460 | 290 | 24 | heavy syrup. |
| | 1.00 | 240 | 2 | 250 | 530 | 480 | 24 | Do. |
| | 1.00 | 240 | 3 | 250 | 670 | 570 | 24 | Do. |
| | 1.00 | 240 | 5 | 250 | 630 | 630 | 24 | Do. |
| | 0.25 | 275 | 2 | 250 | 600 | 360 | 24 | Do. |
| | 0.50 | 275 | 2 | 250 | 580 | 420 | 24 | Do. |
| | 1.00 | 275 | 1 | 250 | 590 | 430 | 24 | Do. |
| | 1.00 | 275 | 2 | 250 | 690 | 530 | 24 | Do. |
| lauroyl carbamyl guanidine neutral sulfate | 1.00 | 240 | 2 | 250 | 310 | 130 | 24 | syrup. |
| | 1.00 | 240 | 3 | 250 | 430 | 250 | 24 | Do. |
| | 1.00 | 240 | 5 | 250 | 490 | 350 | 24 | Do. |

Resin B

| Accelerator | Per Cent | Cure Cycle | | | Shear Strength | | Work Life, Hours | Over Night Set |
|---|---|---|---|---|---|---|---|---|
| | | °F. | Min. | P. s. i. | P. s. i. Dry | P. s. i. Wet | | |
| acetyl carbamyl guanidine neutral sulfate | 0.25 | 240 | 1 | 250 | 410 | 400 | 72.4 | syrup. |
| | 0.25 | 240 | 2 | 250 | 560 | 410 | 72.4 | Do. |
| | 0.25 | 240 | 3 | 250 | 710 | 500 | 72.4 | Do. |
| | 0.25 | 240 | 5 | 250 | 610 | 280 | 72.4 | Do. |
| | 0.50 | 240 | 1 | 250 | 519 | 350 | 76.5 | paste. |
| | 0.50 | 240 | 2 | 250 | 600 | 410 | 76.5 | Do. |
| | 0.50 | 240 | 3 | 250 | 650 | 400 | 76.5 | Do. |
| | 0.50 | 240 | 5 | 250 | 710 | 500 | 76.5 | Do. |
| | 1.00 | 240 | 1 | 250 | 440 | 320 | 76.5 | hard, rubbery. |
| | 1.00 | 240 | 3 | 250 | 570 | 384 | 76.5 | Do. |
| | 1.00 | 240 | 5 | 250 | 540 | 340 | 76.5 | Do. |
| | 1.00 | 240 | 7 | 250 | 570 | 560 | 76.5 | Do. |
| | 1.5 | 240 | 1 | 250 | 490 | 310 | 76.5 | Do. |
| | 1.5 | 240 | 3 | 250 | 570 | 340 | 76.5 | Do. |
| | 1.5 | 240 | 5 | 250 | 580 | 360 | 76.5 | Do. |
| | 1.5 | 240 | 7 | 250 | 560 | 320 | 76.5 | Do. |
| acetyl carbamyl guanidine neutral phthalate | 1.5 | 240 | 1 | 250 | 490 | 350 | 77 | rubbery. |
| | 1.5 | 240 | 2 | 250 | 590 | 350 | 77 | Do. |
| | 1.5 | 240 | 3 | 250 | 590 | 340 | 77 | Do. |
| | 1.5 | 240 | 5 | 250 | 610 | 340 | 77 | Do. |
| | 1.5 | 240 | 7 | 250 | 610 | 390 | 77 | Do. |
| lauroyl carbamyl guanidine neutral sulfate | 1.0 | 240 | 3 | 250 | 480 | 340 | 72.4 | syrup. |
| | 1.0 | 240 | 5 | 250 | 580 | 360 | 72.4 | Do. |
| | 1.0 | 240 | 7 | 250 | 640 | 420 | 72.4 | Do. |

The utilization described hereinabove is solely for the purpose of illustrating one embodiment of this invention, and is not to be construed in any way as a limitation thereof. By like token, the specific resins and curing agents are given solely by way of illustration and not in limitation.

I claim:

1. A stable, rapidly curing composition comprising a fusible thermosetting amino-formaldehyde resin selected from the group consisting of urea formaldehyde and melamine formaldehyde and acetyl carbamylguanidine neutral sulfate.

2. A stable, rapidly curing composition comprising a fusible thermosetting amino-formaldehyde resin selected from the group consisting of urea formaldehyde and melamine formaldehyde and lauroyl carbamylguanidine neutral sulfate.

3. A stable, rapidly curing composition comprising a fusible thermosetting amino-formaldehyde resin selected from the group consisting of urea formaldehyde and melamine formaldehyde and acetyl carbamylguanidine neutral phthalate.

4. A stable, rapidly curing composition comprising a fusible thermosetting amino-formaldehyde resin selected from the group consisting of urea formaldehyde and melamine formaldehyde and 0.25–1.5% an accelerator selected from the group consisting of unsubstituted acyl guanylurea salts and unsubstituted acyl carbamylguanidine salts wherein said acyl group is derived from an organic acid having a dissociation constant not greater than $10^{-5}$.

5. A stable composition comprising a fusible thermosetting amino-formaldehyde resin selected from the group consisting of urea formaldehyde and melamine formaldehyde and an unsubstituted acyl carbamylguanidine neutral sulfate wherein said acyl group is derived from an organic acid having a dissociation constant not greater than $10^{-5}$.

6. A stable composition comprising a fusible thermosetting amino-formaldehyde resin selected from the group consisting of urea formaldehyde and melamine formaldehyde and an unsubstituted acyl carbamylguanidine salt in an amount sufficient to rapidly cure said resin upon the application of heat and pressure wherein said acyl group is derived from an organic acid having a dissociation constant not greater than $10^{-5}$.

7. A stable, rapidly curing adhesive comprising a fusible urea-formaldehyde resin and an unsubstituted acyl carbamylguanidine salt wherein said acyl group is derived from an organic acid having a dissociation constant not greater than $10^{-5}$.

8. A stable, rapidly curing adhesive comprising a fusible melamine-formaldehyde resin and acetyl carbamylguanidine neutral sulfate.

9. A stable, rapidly curing adhesive comprising a fusible melamine-formaldehyde resin and lauroyl carbamylguanidine neutral sulfate.

10. A stable, rapidly curing adhesive comprising a fusible melamine-formaldehyde resin and acetyl carbamylguanidine neutral phthalate.

11. A stable, rapidly curing adhesive comprising a fusible urea-formaldehyde resin and acetyl carbamylguanidine neutral sulfate.

12. A stable, rapidly curing adhesive comprising a fusible urea-formaldehyde resin and lauroyl carbamylguanidine neutral sulfate.

13. A stable, rapidly curing adhesive comprising a fusible urea-formaldehyde resin and acetyl carbamylguanidine neutral phthalate.

14. A stable, rapidly curing composition comprising a fusible, thermosetting amino formaldehyde resin selected from the group consisting of urea-formaldehyde and melamine-formaldehyde, and an accelerator selected from the group consisting of unsubstituted acyl guanylurea salts and unsubstituted acyl carbamyl guanidine salts wherein said acyl group is derived from an organic acid having a dissociation constant not greater than $10^{-5}$.

15. A stable, rapidly curing adhesive comprising a fusible, thermosetting melamine-formaldehyde resin and an unsubstituted acyl carbamyl guanidine salt, wherein said acyl group is derived from an organic acid having a dissociation constant not greater than $10^{-5}$.

DANIEL E. NAGY.

REFERENCES CITED

The following references are of record in the file of this patent:

UNITED STATES PATENTS

| Number | Name | Date |
| --- | --- | --- |
| 2,223,816 | Cordier | Dec. 3, 1940 |
| 2,397,667 | Kaiser et al. | Apr. 2, 1946 |
| 2,446,867 | Cordier | Aug. 10, 1948 |